US009238713B2

United States Patent
Kawasaki et al.

(10) Patent No.: US 9,238,713 B2
(45) Date of Patent: Jan. 19, 2016

(54) 2-PYRROLIDONE POLYMER OR COPOLYMER HAVING MODIFIED PHYSICAL PROPERTIES, AND MANUFACTURING METHOD FOR SAME

(75) Inventors: Norioki Kawasaki, Ikeda (JP); Atsuyoshi Nakayama, Ikeda (JP); Naoko Yamano, Ikeda (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 26 days.

(21) Appl. No.: 14/118,355

(22) PCT Filed: May 22, 2012

(86) PCT No.: PCT/JP2012/063001
§ 371 (c)(1),
(2), (4) Date: Nov. 18, 2013

(87) PCT Pub. No.: WO2012/161174
PCT Pub. Date: Nov. 29, 2012

(65) Prior Publication Data
US 2014/0114045 A1    Apr. 24, 2014

(30) Foreign Application Priority Data
May 25, 2011   (JP) .................... 2011-116784

(51) Int. Cl.
*C08G 69/24*   (2006.01)
*C08G 69/50*   (2006.01)
(52) U.S. Cl.
CPC ............... *C08G 69/24* (2013.01); *C08G 69/50* (2013.01)

(58) Field of Classification Search
CPC .......................................... C08G 69/24
USPC .......................................... 528/248
See application file for complete search history.

(56) References Cited

U.S. PATENT DOCUMENTS

| | | | |
|---|---|---|---|
| 2,434,247 A | 1/1948 | Lewis et al. |
| 2,739,959 A | 5/1948 | Schneider et al. |
| 2,734,004 A | 2/1956 | Robinson |
| 3,277,009 A | 10/1966 | Freifeld et al. |
| 3,322,727 A | 5/1967 | Chiddix et al. |

(Continued)

FOREIGN PATENT DOCUMENTS

| | | |
|---|---|---|
| GB | 583014 | 12/1946 |
| JP | 45-5760 | 2/1970 |
| JP | 50-47681 | 4/1975 |
| JP | 57-20570 | 4/1982 |
| JP | H03233855 A | 10/1991 |
| JP | H03234875 A | 10/1991 |
| JP | 2002-265596 | 9/2002 |
| JP | 2009-155608 | 7/2009 |

OTHER PUBLICATIONS

F. Chuchma et al.: "Polymerization of Lecterns: 57, G.l.c. and n.m.r. analysis of the anionic copolymers of 2-pyrrolidone with 6-cprolactam and 8-octanelactam", Polymer, vol. 24, Nov. 1983. pp. 1491-1494.

(Continued)

*Primary Examiner* — Duc Truong
(74) *Attorney, Agent, or Firm* — Kratz, Quintos & Hanson, LLP (57) ABSTRACT

Disclosed is a 2-pyrrolidone polymer or copolymer having optionally substituted methylol groups, and a process for producing the 2-pyrrolidone polymer or copolymer having methylol groups, the process comprising reacting a 2-pyrrolidone polymer or copolymer with an aldehyde.

6 Claims, 3 Drawing Sheets

(56) References Cited

U.S. PATENT DOCUMENTS 3,366,606 A 1/1968 Chiddix et al.
5,089,360 A 2/1992 Kanno et al.

OTHER PUBLICATIONS

Fumio Kobayashi et al.. "Copolymerization of alpha-Pyrrolidone and epsolon-Caprolactam", Journal of Polymer Science Part A, 1963, vol. 1, pp. 111-123.

S. Barkakay et al.: "Studies on Anionic Polymerization of Lecterns, Part II, Effect of Cocatalysts on the Polymerization of Pyrrolidone", Journal of Polymer Science Part A-1, vol. 4, 1966, pp. 2211-2218.

S. Barkakay et al.: "Studies on Anionic Polymerization of Lactams, Part III. Copolymerization of Pyrrolidone and Caprolactam", Journal of Polymer Science Part A-1, vol. 5, 1967, pp. 965-974.

H. Tani et al.: "Polymerization of Five-, Six-, and Seven-Membered Ring Lactams by Using Metallic Potassium or Metallic Aluminum Alkylate as Catalyst and Certain N-Acyl Lectams or Diphenyl Ketene as Initiator", Journal of Polymer Science, Part A-1, vol. 4, 1966, pp. 301-318.

Extended European Search Report dated Oct. 7, 2014 in the corresponding European patent application No. 12789570.4.

2-PYRROLIDONE POLYMER OR COPOLYMER HAVING MODIFIED PHYSICAL PROPERTIES, AND MANUFACTURING METHOD FOR SAME

TECHNICAL FIELD

The present invention relates to a 2-pyrrolidone polymer or copolymer having modified physical properties, and a process for producing the same.

BACKGROUND ART

Polyamide 4 has a feature of being synthesized from biomass. Specifically, a monomer, 2-pyrrolidone, used as a raw material therefor can be obtained from γ-aminobutyric acid that is made by decarboxylating glutamic acid, which is industrially manufactured by fermenting biomass (i.e., glucose). Polyamide 4 has excellent thermal and mechanical properties because of the strong intermolecular hydrogen bonds due to its macromolecular chain structure comprising short methylene chains. Further, among polyamides, only polyamide 4 is biodegraded by microorganisms in the natural environment, e.g., activated sludge, seawater, and soil. The polymerization mechanism involves bonding of an initiator to form propagation species, and the macromolecular design of polyamide 4 is therefore easy.

Polyamide 4 was synthesized for the first time in 1956 by William O. Ney et al. by using metallic potassium as a basic catalyst and an acyl group-containing compound as an activator, to thereby cause ring-opening polymerization of 2-pyrrolidone to proceed by an activated monomer mechanism (PTL 1). Based on this technique, new technologies pertaining to new catalytic systems, polymerization procedures, copolymerization with ε-caprolactam and the like were continually developed from the 1950s through the 1990s with the aim of increasing the molecular weight, controlling polydispersity, and simplifying the manufacturing process (NPL 1 to 5). Generally, such technologies were intended to manufacture linear polyamide 4 as a commodity material to fabricate fibers and films by melt processing, which is economically advantageous. Although some of the research led to a technology development whereby melt spinning of polyamide 4 became possible, its commercialization was hampered by drawbacks, such as insufficient strength and difficulty in molding.

For overcoming these drawbacks, PTL 2 teaches that polymerization of 2-pyrrolidone by using a basic polymerization catalyst and a carboxylic acid compound produces a uniquely structured 2-pyrrolidone polymer containing structures derived from the carboxylic acid compound, and that the physical properties, such as thermal stability and moldability, of the thus-obtained 2-pyrrolidone polymer can be controlled and improved.

Taking advantage of the ease of macromolecular design, the present inventors used a polyfunctional initiator (1,3,5-benzene tricarbonyl trichloride etc.) as disclosed in PTL 2 to develop polyamide 4 having a 3-branched structure. The development of 3-branched polyamide 4 led to success in achieving a tensile strength higher than that of linear polyamide 4 of an equivalent molecular weight (approx. Mw 100× $10^3$) due to the tangled molecular chains made by introducing the branched structure. Moreover, specimens of 3-branched polyamide 4 were made by injection molding for the purpose of evaluating the basic physical properties of the specimens, such as heat resistance and strength. As a result, the specimens of 3-branched polyamide 4 exhibited performance equivalent to or better than that of polyamide 6, which is a typical engineering plastic.

PTL 3 reports that when carrying out polymerization of 2-pyrrolidone, copolymerization with ε-caprolactam was performed using a basic polymerization catalyst and an initiator that has a structure with two or more branches to control the macromolecular chain structure and the macromolecular chain composition, thereby enabling modification of the physical properties (i.e., mechanical properties and thermal properties).

CITATION LIST

Patent Literature

PTL 1: U.S. Pat. No. 2,739,959
PTL 2: JP2002-265596A
PTL 3: JP2009-155608A

Non-Patent Literature

NPL 1: Chuchma, F. et al: Polymer, 24, 1491-1494 (1983)
NPL 2: Kobayashi, F. et al: Journal of Polymer Science: Part A, 1, 111-123 (1963)
NPL 3: Barzakay, S. et al: Journal of Polymer Science: Part A-1, 4, 2211-2218 (1966)
NPL 4: Barzakay, S. et al: Journal of Polymer Science: Part A-1, 5, 965-974 (1967)
NPL 5: Tani, H. et al: Journal of Polymer Science: Part A-1, 4, 301-318 (1966)

SUMMARY OF INVENTION

Technical Problem

As stated above, polyamide 4 has excellent thermal and mechanical properties. However, the melting point and the thermal decomposition temperature are close to each other; thus, the molding conditions and physical properties of the resin must both be considered in melt processing.

Therefore, an object of the present invention is to provide a 2-pyrrolidone polymer or copolymer that has a melting point that is not close to its thermal decomposition temperature and that has modified physical properties, and to provide a process for producing the same.

Solution to Problem

The inventors found that methylolation of the amide groups in the main chain of polyamide 4 as shown below gives a polyamide 4 having a lower melting point, and therefore achieves the above object.

[Chem. 1]

The present invention was accomplished as a result of further research based on these findings, and provides the following 2-pyrrolidone polymer or copolymer, and a process for producing the same.

I. 2-pyrrolidone Polymer or Copolymer
I-1. A 2-pyrrolidone polymer or copolymer having optionally substituted methylol groups.
I-2. The polymer or copolymer according to item I-1, wherein the methylol groups may be acylated, etherified, urethanized, or carbonated, the thus-modified methylol groups each optionally further comprising a functionally active group.
I-3. The polymer or copolymer according to item I-1 or I-2, having a straight-chain structure or a branched structure.
I-4. The copolymer according to any one of items I-1 to I-3, which is a copolymer of 2-pyrrolidone and a lactam or a lactone.
I-5. The copolymer according to item I-4, wherein the lactam is ε-caprolactam.
I-6. The copolymer according to item I-4, wherein the lactone is ε-caprolactone.
II. Process for Producing a 2-Pyrrolidone Polymer or Copolymer
II-1. A process for producing a 2-pyrrolidone polymer or copolymer having methylol groups, the process comprising reacting a 2-pyrrolidone polymer or copolymer with an aldehyde.
II-2. The process according to item II-1, wherein the aldehyde is paraformaldehyde, formaldehyde, acetaldehyde, or benzaldehyde.
II-3. The process according to item II-1 or II-2, wherein the polymer or copolymer has a straight-chain structure or a branched structure.
II-4. The process according to any one of items II-1 to II-3, wherein the copolymer is a copolymer of 2-pyrrolidone and a lactam or a lactone.
II-5. The process according to item II-4, wherein the lactam is ε-caprolactam.
II-6. The process according to item II-4, wherein the lactone is ε-caprolactone.

Advantageous Effects of Invention

A 2-pyrrolidone polymer or copolymer having methylol groups according to the present invention has excellent properties in that the melting point is lowered, and the melting point is not close to the thermal decomposition temperature. Polyamide 4 having methylol groups exhibits significantly improved elongation at break in an ordinary environment where moisture is present in the air. Furthermore, a 2-pyrrolidone polymer or copolymer having methylol groups according to the present invention is biodegraded by microorganisms in soil or activated sludge when the content of methylol groups is 20% or less.

DESCRIPTION OF EMBODIMENTS

Hereinafter, the present invention will be described in more detail.

The 2-pyrrolidone polymer or copolymer of the present invention is characterized by having optionally substituted methylol groups.

Thus, methylolation of the 2-pyrrolidone polymer or copolymer gives a 2-pyrrolidone polymer or copolymer having a lower melting point, and increases the difference between the melting point and the thermal decomposition temperature, thereby enabling melt processing. Moreover, the 2-pyrrolidone polymer or copolymer having methylol groups of the present invention is biodegradable.

The 2-pyrrolidone polymer (polyamide 4 or nylon 4) used in the present invention can be produced following an ordinary method. There is no particular restriction on the 2-pyrrolidone copolymer insofar as the effects of the present invention are produced, and examples thereof include a copolymer of 2-pyrrolidone and a lactam, such as ε-caprolactam, and a copolymer of 2-pyrrolidone and a lactone, such as ε-caprolactone. These copolymers can also be produced following an ordinary method.

A copolymer of 2-pyrrolidone and a lactone is synthesized by adding a basic initiator, e.g., n-butyllithium, to two raw material monomers (i.e., 2-pyrrolidone and a lactone), in an amount of about 0.2 to 2 mol % relative to both monomers, followed by reaction at a temperature in the range from room temperature to about 50° C. for about 24 to 72 hours. For example, polymerization of 2-pyrrolidone and ε-caprolactone in a ratio of 90:10 results in a minimum 80% yield of a copolymer that has a composition ratio of 90:10 and a molecular weight of 10,000 or more. Copolymerization in a ratio of 50:50 results in a 65% yield of a copolymer that has a composition ratio of 44:56 to 50:50 and a molecular weight of about 10,000.

Methylol groups (—CH$_2$OH) are present in amide groups of the 2-pyrrolidone polymer or copolymer. The methylol groups are optionally substituted; for example, the hydroxyl groups of the methylol groups may be acylated, etherified, urethanized, carbonated, etc. Herein, examples of acylated hydroxyl groups include alkylcarbonyloxy, preferably acetyloxy. Examples of etherified hydroxyl groups include alkyloxy, preferably methoxy. Examples of urethanized hydroxyl groups refer to carbamic acid ester groups —CH$_2$OC(=O)NHR$^1$ wherein R$^1$ is preferably hydrogen, alkyl, or aryl. Carbonated hydroxyl groups refer to carbonated ester groups —CH$_2$OC(=O)OR$^2$ wherein R$^2$ is preferably alkyl or aryl. The above methylol groups, which are modified by acyl, for example, may have a functionally active group, such as a pesticide or a pigment, introduced thereinto. Methods of such acylation, etherification, urethanization, or carbonation of methylol groups are known.

The above alkyl groups may be straight-chained or branched, and preferably have 1 to 18 carbon atoms, with 1 to 6 carbon atoms being more preferred. As used herein, the term "alkyl" includes the alkyl moiety of the above alkylcarbonyloxy and alkyloxy. Specific examples of alkyl groups include methyl, ethyl, n-propyl, isopropyl, n-butyl, isobutyl, tert-butyl, n-pentyl, isopentyl, and hexyl.

The aryl group refers to a monocyclic or polycyclic group formed of a 5- or 6-membered aromatic hydrocarbon ring or rings. Specific examples of aryl groups include phenyl, naphthyl, fluorenyl, anthryl, biphenylyl, tetrahydronaphthyl, chromanyl, 2,3-dihydro-1,4-dioxa naphthalenyl, indanyl, and phenanthryl.

The 2-pyrrolidone polymer or copolymer having methylol groups of the present invention preferably has no melting point (amorphous) or has a melting point of 270° C. or below, more preferably 120 to 260° C., and particularly more preferably 160 to 255° C.

The degree of methylolation of the 2-pyrrolidone polymer or copolymer having methylol groups of the present invention is preferably 1 to 50%, and more preferably 4 to 25%. The degree of methylolation is calculated according to the procedure described in the Examples. As shown in the Examples, the melting point tends to decrease as the degree of methylolation increases. Within the above range of the degree of methylolation, the melting point is not excessively low, and is within a proper range.

The 2-pyrrolidone polymer or copolymer having methylol groups of the present invention is produced by reacting a 2-pyrrolidone polymer or copolymer with an aldehyde. There is no particular restriction on the aldehyde insofar as the 2-pyrrolidone polymer or copolymer is methylolated, and examples thereof include paraformaldehyde, formaldehyde, acetaldehyde, and benzaldehyde, with paraformaldehyde and formaldehyde being preferred.

The amount of aldehyde to be used is preferably 0.01 to 6 mols, and more preferably 0.2 to 3 mols, per mol of the 2-pyrrolidone polymer or copolymer (the term "mol" is expressed based on the molecular weight of the constitutional repeating unit; the same applies to the mol of polymers in the description below). The degree of methylolation tends to increase as the amount of the aldehyde used increases; thus, adjusting the amount of the aldehyde to be used controls the degree of methylolation.

For reaction, a polar solvent, such as methanol, may be used. For dissolving a 2-pyrrolidone polymer or copolymer, a solvent that is known to dissolve polyamide 4, such as formic acid, trifluoroethanol, and hexafluoroisopropanol, may be used. However, it is also possible to carry out the reaction in a heterogeneous system without dissolving the 2-pyrrolidone polymer or copolymer in a reaction solvent.

The reaction is carried out at a temperature of about 5 to 100° C., and more preferably at about 20 to 60° C. The reaction time is about 10 minutes to 10 hours, and preferably about 30 minutes to 120 minutes for a homogenous system, and a longer period of time is required for reaction in a heterogeneous system.

The 2-pyrrolidone polymer or copolymer having methylol groups that has been produced with a homogeneous system can be collected according to an ordinary method, for example, using acetone precipitation. When a heterogeneous system is used, collection can be performed after washing with acetone.

The 2-pyrrolidone polymer having methylol groups according to the present invention may have a straight-chain structure or a branched structure. Introducing a branched structure enhances the physical properties (tensile strength). A 2-pyrrolidone polymer having a straight-chain structure or a branched structure is synthesized according to the disclosure of JP Patent No. 3453600.

The 2-pyrrolidone copolymer having methylol groups according to the present invention may also have a straight-chain structure or a branched structure, and is preferably a straight-chain or branched copolymer of 2-pyrrolidone and ε-caprolactam. Introducing a branched structure into a copolymer gives a copolymer having a lower melting point and flexibility. A straight-chain or branched copolymer of 2-pyrrolidone and ε-caprolactam is synthesized according to the disclosure of JP2009-155608A.

The 2-pyrrolidone polymer or copolymer having methylol groups according to the present invention is readily made into molded articles through melt processing due to the difference between the melting point and the thermal decomposition temperature. The melt processing refers to a method for molding a resin composition by melting it with heat, and examples of such molding methods include melt spinning, injection molding, extrusion molding, blow molding, and press molding. Examples of molded articles obtained through the melt processing include fibers, films, sheets, tubes, containers, and rods.

EXAMPLES

Hereinafter, the present invention will be described in more detail with reference to the Examples. However, the scope of the present invention is not limited to these Examples. The polyamide 4 used in Examples 1 to 10 is triply branched polyamide 4.

Example 1

Polyamide 4 (4.26 g, 50 mmol) was dissolved in formic acid (38.4 g, 835 mmol) at room temperature, and the solution was heated to 60° C. A solution of paraformaldehyde (0.27 g, 9.0 mmol) in methanol (5.4 ml) was prepared, and added portionwise to the polyamide solution at 60° C. Ten minutes later, methanol (5.4 ml) was added to the mixture quickly and the resulting mixture was subjected to reaction for about 2 hours. The solvent was evaporated off under reduced pressure using a vacuum pump to concentrate the reaction mixture, followed by precipitation with acetone to purify the reaction product.

Example 2

Methylolation of polyamide 4 was carried out in the same manner as in Example 1 except that paraformaldehyde in the amount of 0.53 g, 17.6 mmol, was used in place of paraformaldehyde in the amount of 0.27 g, 9.0 mmol.

Example 3

Methylolation of polyamide 4 was carried out in the same manner as in Example 1 using paraformaldehyde in the amount of 0.67 g, 22.3 mmol, in place of paraformaldehyde in the amount of 0.27 g, 9.0 mmol.

Example 4

Methylolation of polyamide 4 was carried out in the same manner as in Example 1 using paraformaldehyde in the amount of 0.80 g, 26.6 mmol, in place of paraformaldehyde in the amount of 0.27 g, 9.0 mmol.

Example 5

Methylolation of polyamide 4 was carried out in the same manner as in Example 1 using paraformaldehyde in the amount of 1.07 g, 35.6 mmol, in place of paraformaldehyde in the amount of 0.27 g, 9.0 mmol.

Example 6

Reaction Time Set to 30 Minutes

Polyamide 4 (4.26 g, 50 mmol) was dissolved in formic acid (38.4 g, 835 mmol) at room temperature, and the solution was heated to 60° C. A solution of paraformaldehyde (1.07 g, 35.6 mmol) in methanol (5.4 ml) was prepared, and added portionwise to the polyamide solution at 60° C. Ten minutes later, methanol (5.4 ml) was added to the mixture quickly and the resulting mixture was subjected to reaction for about 30 minutes. After the heating was finished, acetone was added to the reaction mixture for precipitation, to thereby purify the reaction product.

Example 7

Methylolation of polyamide 4 was carried out in the same manner as in Example 6 using paraformaldehyde in the amount of 2.13 g, 7.09 mmol, in place of paraformaldehyde in the amount of 0.27 g, 9.0 mmol.

Example 8

Methanol Not Used as a Reaction Solvent

Polyamide 4 (4.26 g, 50 mmol) was dissolved in formic acid (38.4 g, 835 mmol) at room temperature, and the solution was heated to 60° C. A solution of paraformaldehyde (0.53 g, 17.6 mmol) in formic acid (6.59 g, 143 mmol) was prepared, and added portionwise to the polyamide solution at 60° C., followed by reaction for about 1 hour. The solvent was evaporated off under reduced pressure using a vacuum pump to concentrate the reaction mixture, followed by precipitation with acetone to purify the reaction product.

Example 9

Polyamide 4 Subjected to Reaction in a Heterogeneous System without being Dissolved in a Reaction Solvent Formic acid (1.60 g, 34.7 mmol) was added to a solution of paraformaldehyde (1.07 g, 35.6 mmol) in methanol (5.4 ml) to prepare a solution. Granular polyamide 4 (1.07 g, 12.6 mmol) was added to the prepared solution and a heterogeneous reaction was carried out at 60° C. for 6 days. After completion of the reaction, the reaction product was filtered off and washed with acetone.

Example 10

Copoly(2-pyrrolidone/ε-caprolactam) Subjected to Reaction

Copoly(2-pyrrolidone/ε-caprolactam) (4.26 g, 48 mmol) (composition ratio, i.e., molar ratio: 2-pyrrolidone/ε-caprolactam=87/13), which is a kind of copolyamide, was dissolved in formic acid (38.4 g, 835 mmol) at room temperature, and the solution was heated to 60° C. A solution of paraformaldehyde (0.53 g, 17.6 mmol) in formic acid (6.59 g, 143 mmol) was prepared, and added portionwise to the copolyamide solution at 60° C., followed by reaction for about one hour. The solvent was evaporated off under reduced pressure by using a vacuum pump to concentrate the reaction mixture, followed by precipitation with acetone to purify the reaction product.

Table 1 shows the reaction conditions and yields of Examples 1-10 above. The obtained methylolated polyamide 4 polymers and copolymer and the polyamide 4 used as a raw material (Comparative Example 1) were evaluated for the following properties. Table 2 shows the results.

Number Average Molecular Weight and Weight Average Molecular Weight

The number average molecular weight and weight average molecular weight were calculated from the measurement results obtained using a high-speed gel permeation chromatography system (HLC-8220GPC system, column TSKgel Super HM-N and H-RC, manufactured by Tosoh Corporation) using polymethylmethacrylate as a standard substance.

Melting Point, Heat of Fusion, and Thermal Decomposition Temperature

The melting point, heat of fusion, and thermal decomposition temperature were measured with a thermal analysis system (DSC3100S and TG-DTA2000SA system manufactured by Bruker AXS K. K.) at a heating rate of 10° C./min.

Tensile Strength and Breaking Elongation

The polyamide 4 polymers and copolymer obtained in Examples 1 to 10 and the polyamide 4 used as a raw material (Comparative Example 1) were made into films through a solvent casting technique using trifluoroethanol as a solvent, and the obtained films were processed into rectangular specimens having a thickness of 47 μm (average), a length of 15 mm, and a width of 5 mm. The tensile strength and elongation at break were measured with a universal testing machine (Auto com/AC-50 manufactured by T.S. Engineering), and the average of 15 measurement values was calculated for each specimen. The specimens from Examples 1 to 5 were dried under reduced pressure in a hot desiccator at 100° C. for a day or longer using an oil-sealed rotary vacuum pump, and then immediately measured. The specimens from Examples 6 to 9 were dried under reduced pressure in a hot desiccator at 40° C. for a day or longer, and allowed to stand in air for a day or longer, followed by measurement.

Degree of Methylolation

$^1$HNMR was measured and the degree of methylolation was calculated from the integration ratio of the peak due to methylol groups to the peak due to methylene groups in the main chains.

TABLE 1

Conditions of reaction of polyamide 4 with paraformaldehyde, and the yield

| | Polyamide 4 (g); (mmol) | Paraformaldehyde (g); (mmol) | Methanol (ml); (mmol) | Formic Acid (ml); (mmol) | Yield (g) | Notes |
|---|---|---|---|---|---|---|
| Example 1 | 4.26; 50 | 0.27; 9 | 10.8; 267 | 31.5; 835 | 4.21 | Reaction time 2 hr, White solid |
| Example 2 | 4.26; 50 | 0.53; 18 | 10.8; 267 | 31.5; 835 | 4.40 | Reaction time 2 hr, White solid |
| Example 3 | 4.26; 50 | 0.67; 22 | 10.8; 267 | 31.5; 835 | 4.49 | Reaction time 2 hr, White elastic solid |

TABLE 1-continued

Conditions of reaction of polyamide 4 with paraformaldehyde, and the yield

| | Polyamide 4 (g); (mmol) | Paraformaldehyde (g); (mmol) | Methanol (ml); (mmol) | Formic Acid (ml); (mmol) | Yield (g) | Notes |
|---|---|---|---|---|---|---|
| Example 4 | 4.26; 50 | 0.80; 27 | 10.8; 267 | 31.5; 835 | 4.88 | Reaction time 2 hr, White elastic solid |
| Example 5 | 4.26; 50 | 1.07; 36 | 10.8; 267 | 31.5; 835 | 5.05 | Reaction time 2 hr, White elastic solid |
| Example 6 | 4.26; 50 | 1.07; 36 | 10.8; 267 | 31.5; 835 | 4.27 | Reaction time 30 min, White solid |
| Example 7 | 4.26; 50 | 2.13; 71 | 10.8; 267 | 31.5; 835 | 4.30 | Reaction time 30 min, White solid |
| Example 8 | 4.26; 50 | 0.53; 18 | 0; 0 | 31.5; 835 | 4.24 | Reaction time 1 hr, White solid |
| Example 9 | 1.07; 13 | 1.07; 36 | 5.4; 133 | 1.31; 35 | 1.12 | Heterogeneous, reaction time 6 day, White powder |
| Example 10 | 4.26; 48 | 0.53; 18 | 0; 0 | 31.5; 835 | 4.49 | Copolyamide used, Reaction time 1 hr, White solid |

TABLE 2

Melting point, heat of fusion, thermal decomposition temperature, tensile strength, and breaking elongation of methylolated polyamide 4

| | $Mn \times 10^{-3}$ | $Mw \times 10^{-3}$ | Mw/Mn | Melting Point Tm (°C.) | Heat of fusion $\Delta$Hm (J/g) | Thermal Decomposition Temperature Td (°C.) | Tensile Strength (MPa) | Elongation at Break (%) | Notes |
|---|---|---|---|---|---|---|---|---|---|
| Comparative Example 1 | 27.3 | 130.8 | 4.79 | 267.9 | 83 | 280.9 | 63.6 ± 1.1 | 42 ± 1 | Material PA4 |
| Example 1 | 26.9 | 137.1 | 5.10 | 251.2 | 61 | 279.7 | 67.9 ± 0.9 | 25 ± 1 | Degree of Methylolation 4.5% |
| Example 2 | 22.1 | 92.3 | 4.18 | 245.8 | 47 | 278.4 | 46.0 ± 1.5 | 14 ± 1 | Degree of Methylolation 6.5% |
| Example 3 | 25.9 | 66.1 | 2.55 | 214.9 | 16 | 279.4 | 52.7 ± 2.0 | 14 ± 1 | Degree of Methylolation 13.5% |
| Example 4 | 24.6 | 73.3 | 2.98 | 227.8 | 31 | 277.9 | 44.7 ± 1.8 | 12 ± 0 | Degree of Methylolation 9.5% |
| Example 5 | 25.7 | 63.8 | 2.48 | 164.1 | 3 | 279.4 | 57.3 ± 1.2 | 14 ± 0 | Degree of Methylolation 22.5% |
| Example 6 | 19.3 | 134.9 | 6.98 | 253.4 | 35 | 277.3 | 37.5 ± 0.4 | 201 ± 6 | Degree of Methylolation 4.0% |
| Example 7 | 35.0 | 543.1 | 15.33 | 236.6 | 26 | 279.0 | 36.0 ± 0.5 | 352 ± 16 | Degree of Methylolation 6.0% |
| Example 8 | 27.8 | 73.0 | 2.63 | 165.9 | 2 | 281.2 | 4.8 ± 0.2 | 492 ± 25 | Degree of Methylolation 22.5% |
| Example 9 | 30.7 | 310.5 | 10.1 | 255.0 | 47 | 271.5 | 37.8 ± 0.7 | 285 ± 11 | Degree of Methylolation 6.5% |
| Example 10 | 27.1 | 61.5 | 2.27 | None | None | 290.2 | Not measured | Not measured | Degree of Methylolation 21.0% |

Table 1 shows that as the amount of paraformaldehyde fed relative to polyamide 4 increased, the obtained products became elastic solids, and the yields tended to increase.

Figure 1:
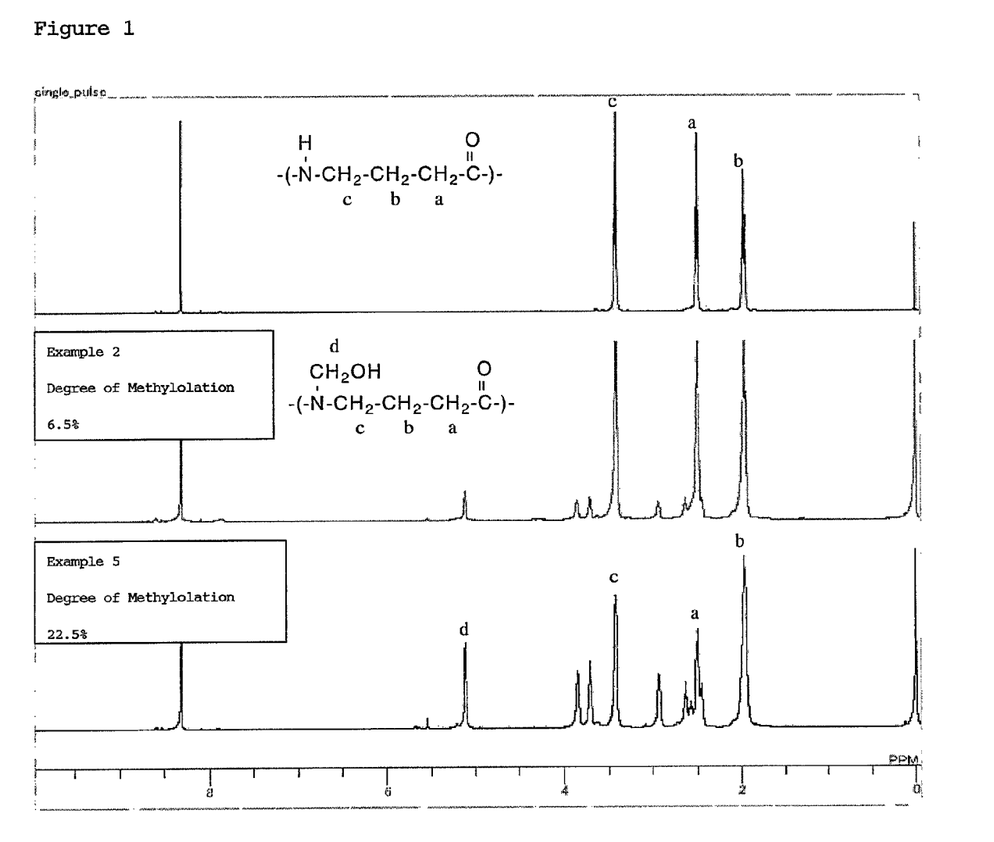
FIG. 1 is a chart showing $^1$HNMR spectra of polyamide 4 and methylolated polyamide (Examples 2 and 5).

FIG. 1 shows $^1$HNMR spectra of polyamide 4 used as a raw material and polyamide 4 polymers obtained through reaction. Methylolation of the amide groups of the polyamide 4 was confirmed because, besides the peaks due to the polyamide 4 used as a raw material, a peak due to the methylol groups appeared. In FIG. 1, the spectra of the products of Examples 2 and 5 are shown. The degrees of methylolation of the products of Examples 2 and 5, when calculated from the integration ratios of proton peak b due to the unmethylolated portion to new proton peak d that appeared as a result of methylolation, were estimated to be 6.5% and 22.5%, respectively.

Regarding the molecular weight of the products obtained through reaction, when the reaction time was two hours, there was substantially no change in number average molecular weight, but there was a decrease in weight average molecular weight, as compared to the polyamide 4 used as a raw material. When the reaction time was 30 minutes, there was substantially no decrease in weight average molecular weight although the amount of introduced methylol groups decreased.

Regarding the melting point and heat of fusion, the products of all Examples had lower melting points and lower heats of fusion. The peaks of fusion became smaller in shape and markedly broader in width as the amount of paraformaldehyde fed relative to polyamide 4 increased.

Methylolation occurred even when methanol was not used as a reaction solvent (Example 8), and also when a heterogeneous reaction was carried out without dissolving polyamide 4 in a reaction solvent (Example 9). Methylolation also occurred even when paraformaldehyde was reacted with copoly(2-pyrrolidone/ε-caprolactam) that was used as a raw material (Example 10).

Figure 2:
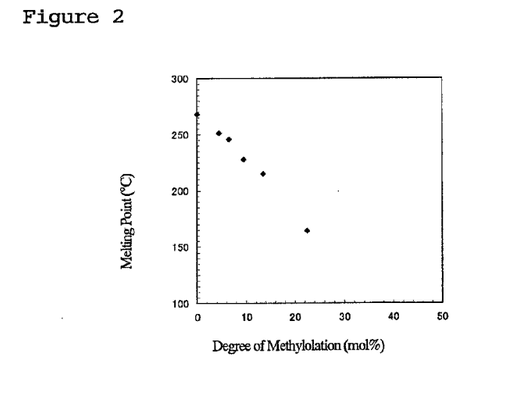
FIG. 2 is a graph showing the relationship between the degrees of methylolation of polyamide 4 polymers obtained in the Examples, and their melting points.
Figure 3:
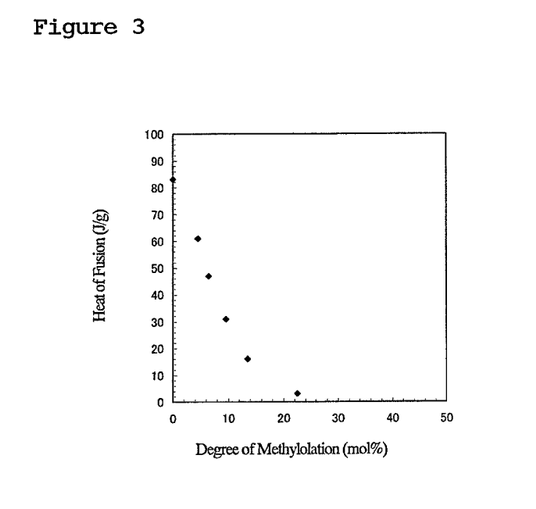
FIG. 3 is a graph showing the relationship between the degrees of methylolation of polyamide 4 polymers obtained in the Examples, and their heats of fusion.

It was found that controlling the degree of methylolation of polyamide 4 enables modifying its thermophysical properties, as seen from the relationship between the degree of methylolation of polyamide 4 and its melting point shown in FIG. 2, and the relationship between the degree of methylolation of polyamide 4 and its heat of fusion shown in FIG. 3.

It was observed that as compared to polyamide 4 before methylolation, the methylolated polyamide 4 polymers immediately after being dried in a hot desiccator do not exhibit a remarkable difference in tensile strength, and tend to have lower elongation at break. In contrast, it was seen that when left to stand in air and allowed to absorb moisture after drying in a hot desiccator, the methylolated polyamide 4 polymers show lower tensile strengths but significantly increased elongation at break. It was revealed that controlling the degree of methylolation of methylolated polyamide 4 can transform a hard and strong material into a hard and elastic material.

Example 11

Formalin Used

A powder of polyamide 4 (1.07 g, 12.6 mmol) was added to a mixture of formalin (37%) (6.0 ml, 73.3 mmol) and formic acid (0.55 ml, 14.6 mmol), and the resulting mixture was stirred with heating at 60° C. for one day. The reaction mixture was filtered through a glass filter, and the filtrate was heated to 40° C., followed by water evaporation using a vacuum pump. The resulting product was dissolved in trifluoroethanol, followed by filtration through a glass filter, and then formed into a film through a solvent casting technique.

Yield 2.07 g

The melting point (about 265° C.) that PA4 had was lost.

Fusion peak: 123.5° C. (83.4° C. to 144.4° C.).

This process is safe and convenient because a large amount of formic acid is not used as a solvent.

Biodegradability of Methylolated Polyamide 4

The biodegradability of methylolated polyamide 4 in activated sludge was studied using a closed system pressure measuring resipirometer (BOD TESTER 200F and COOLNIT CL-150R system manufactured by TAITEC Corporation) as described below. A polymer sample (30 mg) was dispersed in 200 ml of an inorganic medium as described in JIS K 6950, and 20 ml (dry weight: 33 mg) of standard activated sludge provided by Chemicals Evaluation and Research Institute Japan was added thereto. In a closed system culture vessel, generated carbon dioxide was absorbed at 27° C. by a calcium hydroxide on a pan placed in the culture vessel, and the amount of consumed oxygen was measured as a decrease in volume by reading the scale on a burette connected to a water bath. This procedure was conducted for one month to carry out a biodegradation test. The amount of oxygen consumed through biodegradation was calculated by deducting the amount of oxygen consumed through biodegradation in a comparison test carried out using only the activated sludge to which no polymer sample was added. The biodegradability (%) of the polymer sample was calculated by dividing the amount of oxygen consumed through biodegradation by a theoretical amount of oxygen, and multiplying the obtained value by 100. The theoretical amount of oxygen is the total amount of oxygen required for converting all of the carbon contained in the polymer into carbon dioxide, nitrogen into nitrate ions, and hydrogen into water when the entire polymer sample is biodegraded.

Figure 4:
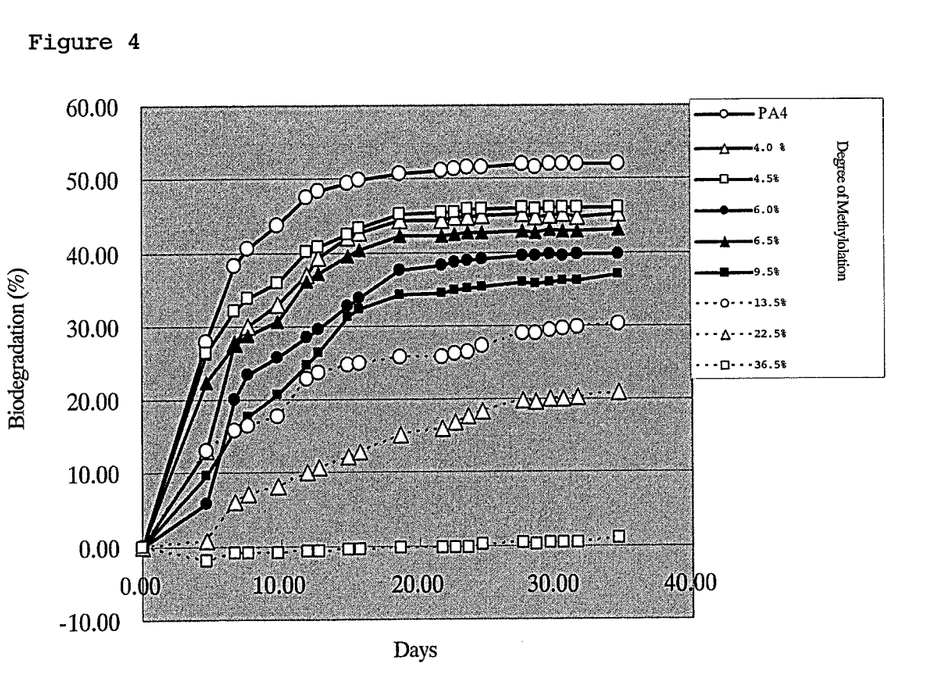
FIG. 4 is a graph showing the biodegradation of methylolated polyamide 4 polymers placed in activated sludge.
Figure 5:
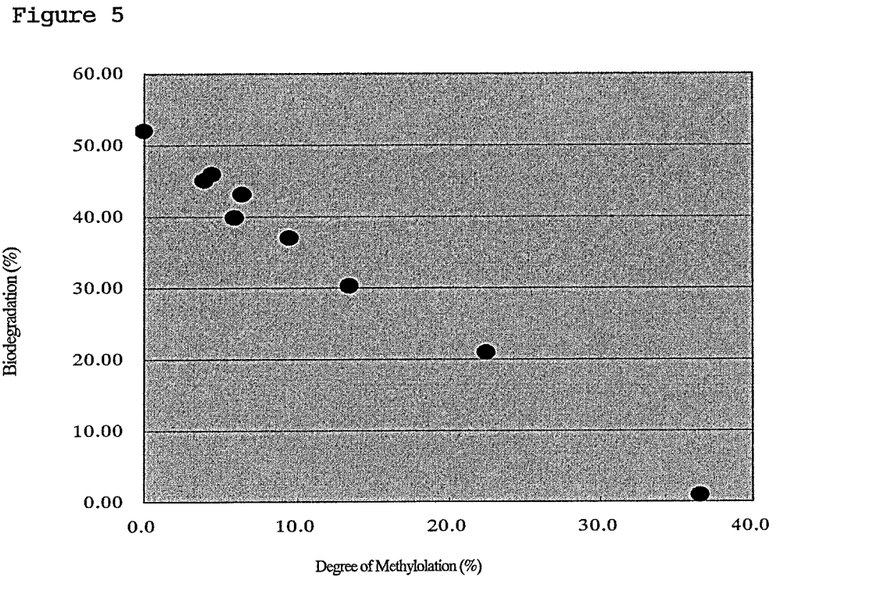
FIG. 5 is a graph showing the relationship between the degrees of methylolation of methylolated polyamide 4 polymers and their biodegradation after the methylolated polyamide 4 polymers were placed in activated sludge for four weeks.

FIG. 4 shows the time-course in biodegradation of methylolated polyamide 4 polymers obtained in the Examples and placed in standard activated sludge. FIG. 5 shows the relationship between the degree of methylolation of methylolated polyamide 4 polymers and their biodegradation after methylolated polyamide 4 polymers were placed in activated sludge for four weeks. It was confirmed that adjusting the degree of methylolation of polyamide 4 enables control of the biodegradation.

The invention claimed is:

1. A 2-pyrrolidone polymer or copolymer having methylol groups and having a branched structure,
   wherein the degree of methylolation of the polymer is 4 to 50%.

2. The copolymer according to claim 1, which is a copolymer of 2-pyrrolidone and a lactam or a lactone.

3. A process for producing a 2-pyrrolidone polymer or copolymer having methylol groups, the process comprising reacting a 2-pyrrolidone polymer with paraformaldehyde or formaldehyde,
   wherein the polymer has a branched structure, and
   wherein the degree of methylolation of the polymer is 4 to 50%.

4. The process according to claim 3, wherein the copolymer is a copolymer of 2-pyrrolidone and a lactam or a lactone.

5. The polymer according to claim 1, wherein the elongation at break of the polymer is 201 to 492%.

6. The process according to claim 3, wherein the elongation at break of the polymer is 201 to 492%.

* * * * *